United States Patent
Challis

(10) Patent No.: US 7,029,133 B2
(45) Date of Patent: Apr. 18, 2006

(54) ADJUSTABLE SECURITY ENCLOSURE

(75) Inventor: Roger W. Challis, Vancouver (CA)

(73) Assignee: Hard Steal Security Corp., Vancouver (CA)

(*) Notice: Subject to any disclaimer, the term of this patent is extended or adjusted under 35 U.S.C. 154(b) by 0 days.

(21) Appl. No.: 10/878,436

(22) Filed: Jun. 29, 2004

(65) Prior Publication Data

US 2005/0286028 A1 Dec. 29, 2005

(51) Int. Cl.
*G03B 21/14* (2006.01)
*F16M 13/00* (2006.01)

(52) U.S. Cl. .................................. 353/119; 248/551

(58) Field of Classification Search ............... 353/119, 353/72, 79, 122; 248/176.1, 176.3, 70
See application file for complete search history.

(56) References Cited

U.S. PATENT DOCUMENTS

| | | | |
|---|---|---|---|
| 3,771,338 A | 11/1973 | Raskin | |
| 4,252,007 A | 2/1981 | Kerley | |
| 4,600,249 A | 7/1986 | Anderson | |
| 5,090,654 A | 2/1992 | Ridings et al. | |
| 5,105,335 A | 4/1992 | Honda | |
| 5,162,976 A | 11/1992 | Moore et al. | |
| 5,261,645 A * | 11/1993 | Huffman | 254/267 |
| 5,349,400 A * | 9/1994 | Kaplan et al. | 353/119 |
| 5,366,203 A * | 11/1994 | Huffman | 254/362 |
| 5,490,655 A * | 2/1996 | Bates | 248/329 |
| 5,551,658 A | 9/1996 | Dittmer | |
| 5,595,074 A | 1/1997 | Munro | |
| 5,624,173 A * | 4/1997 | Davidson | 353/119 |
| 5,640,215 A | 6/1997 | Catta | |
| 5,725,190 A | 3/1998 | Cuthbertson et al. | |
| 5,816,076 A * | 10/1998 | Biedermann et al. | 70/57 |
| 5,938,161 A | 8/1999 | Takeuchi et al. | |
| 5,960,653 A | 10/1999 | DeWalch et al. | |
| 6,042,068 A | 3/2000 | Tcherny | |
| 6,166,910 A * | 12/2000 | Ronberg et al. | 361/724 |
| 6,311,943 B1 | 11/2001 | Tang | |
| 6,379,012 B1 * | 4/2002 | Enochs et al. | 353/79 |
| 6,439,527 B1 | 8/2002 | Lin | |
| 6,606,887 B1 * | 8/2003 | Zimmer et al. | 70/164 |
| 2003/0234335 A1 * | 12/2003 | Umberg | 248/551 |
| 2005/0035253 A1 * | 2/2005 | Rixom | 248/284.1 |

FOREIGN PATENT DOCUMENTS

| | | |
|---|---|---|
| CA | 2214699 | 11/1998 |
| CA | 2232729 | 9/1999 |
| CA | 2436762 | 7/2002 |

(Continued)

*Primary Examiner*—William C. Dowling
(74) *Attorney, Agent, or Firm*—Brian Y. Lee

(57) ABSTRACT

This invention relates to an apparatus for securing a projector. The apparatus is mountable to a ceiling drop pipe and comprises a cage and a drop pipe connector assembly. The cage has a plurality of interconnected members that together define an enclosure for housing a projector and impeding removal of the projector from the cage. At least some of the members are connected together by a member fastener that is fastenable only from inside the cage. The position of at least some of the members can be adjusted relative to other members so that the size of the enclosure can be adjusted to fit the projector snugly therein, thereby impeding access to the fastener.

10 Claims, 10 Drawing Sheets

FOREIGN PATENT DOCUMENTS

| | | |
|---|---|---|
| CA | 2349731 | 12/2002 |
| CA | 2404544 | 3/2004 |
| EP | 0 332 762 A1 | 9/1989 |
| WO | WO 98/39993 | 9/1998 |
| WO | WO 02/059442 A1 | 8/2002 |
| WO | WO 03/067142 A1 | 8/2003 |

* cited by examiner ated security enclosures, and in particular, to security enclosures that are adjustable to enclose portable electronic equipment such as projectors, that are of different sizes and dimensions.

ADJUSTABLE SECURITY ENCLOSURE

FIELD OF THE INVENTION

This invention relates generally to adjustable security enclosures, and in particular, to security enclosures that are adjustable to enclose portable electronic equipment such as projectors, that are of different sizes and dimensions.

BACKGROUND OF THE INVENTION

Portable electronic equipment such as projectors are prone to theft. Replacing stolen equipment can be expensive and distracting. Electronic equipment theft is particularly problematic for organizations that must expose their equipment to the public. For example, schools and conference centres have meeting rooms that are equipped with presentation equipment, such as computers, and video I data projectors. Projectors can be portable units placed on top of a table and removed after each use. Projectors that are placed on tables can be removed from the room after each use; however, transporting and setting up the projector in the room each time it is to be used tends to be time consuming and is undesirable when the room is frequently used for presentations. Since such projectors are not secured, care must be taken to guard the projector to ensure it is not stolen. Or, projectors can be mounted in a substantially permanent location, such as from a threaded drop pipe extending downwards from the room's ceiling.

Ceiling mounted projectors are desirable as they free up desk space, and are mounted out of the way of people in the room. Projector manufacturers typically provide optional ceiling mounting plates for their projectors; the mounting plates typically include a threaded portion that mates with the threaded portion of the drop pipe, and fasteners for securing the mounting plate to screw holes in the data projector itself. Optionally, an adjustment bracket can be coupled between the mounting plate and the drop pipe, to enable the projector to be tilted so that the projected image is centred on a screen.

Such ceiling mounting hardware is not particularly secure—a thief can simply remove the fasteners that attach the adjustment bracket to the mounting plate, or remove the fasteners in the adjustment bracket itself, or remove the fasteners which attach the mounting plate to the projector. Various prior art solutions have been proposed to prevent removal of the mounting plate/adjustment bracket from the projector or drop pipe. For example, Chief Manufacturing Inc. advertises for sale a projector security device under the brand name "PG-1 Projector Guard"—this device is a cage that encloses a projector and its ceiling mounting hardware. Disadvantageously, the cage is not adjustable in size to accommodate projectors of different sizes; use of the cage to enclose smaller projectors tend to be aesthetically unpleasing. More problematic is that the device is simply an enclosure that uses the projector's existing mounting hardware. Furthermore, the cage must be completely removed from the projector to allow access to the projector for regular maintenance, which is time consuming.

Peerless Industries, Inc. is another company that advertises for sale a projector security device, under the brand name Armor Lock Box; unlike the Chief device, the Peerless security device is a combined enclosure and mount, for enclosing a projector and mounting it to a ceiling drop pipe. However, like the Chief device, the Peerless device includes a cage that is not adjustable to accommodate projectors of different sizes. This security device is also problematic as It must be completely removed to allow access to the projector for regular maintenance.

SUMMARY OF THE INVENTION

It is an object of the invention to provide an improved apparatus for securing portable electronic devices such as projectors. In particular, it is an object to provide an adjustable apparatus for securing projectors of different sizes to a ceiling mounted drop pipe.

According to one aspect of the invention, there is provided an apparatus for securing an audio video device such as a projector. This apparatus is mountable to a ceiling drop pipe and comprises a cage for housing the device and a connector assembly for connecting the cage to a fixture such as a ceiling mounted drop pipe. The cage has a plurality of interconnected members that together define an enclosure for housing a projector and impeding removal of the projector from the cage. At least some of the members are connected together by at least one member fastener that can be unfastened from inside the cage, such that the position of at least some of the members can be adjusted relative to other members so that the size of the enclosure can be adjusted to fit the projector snugly therein, thereby impeding access to the fastener. When securing projectors, the connector assembly is connectable to a ceiling drop pipe, and has a cage mounting portion mounted to at least one of the members by at least one removable connector assembly fastener that can be unfastened from inside the cage.

Two of the members can be top plates connected to each other by at least one of the member fasteners, and laterally adjustable relative to each other such that the width of the cage can be adjusted. In such case, the cage mounting portion of the connector assembly can be mounted to one of the top plates. Also, some of the members can be top plate members that extend downwardly from the top plates; in such case, some of the members can be vertically extending members that extend generally vertically and are adjustably connected to the top plate members by at least one of the member fasteners such that the height of the cage can be adjusted. Furthermore, some of the members can be lateral support members for supporting a projector and which extend laterally from the vertically-extending members and are adjustably connected to each other by at least one of the member fasteners such that the width of the cage can be adjusted, for example, to match the width of the top plates.

Some of the members can form a lock bar assembly that comprises a top track securably fastened to at least one of the top plates and a pair of L-shaped wings having a downwardly-extending portion for impeding removal of the projector from the cage, and a laterally-extending portion connected to the top track by at least one of the member fasteners such that the depth of the cage can be adjusted.

When so configured, the size of the cage can be adjusted laterally in width and depth and vertically in height, so that the projector or other audio-video device is fit snugly inside the cage. As the member fasteners are all installed in a manner that they can be only unfastened from inside the cage, and the snug fit of the projector inside the cage impedes access to the fasteners, thereby making it difficult for a person to adjust the size of the cage in order to remove the projector.

The top track can be removably mounted to the at least one of the top plates by a lock. In such case, removal of the top track from the rest of the cage enables installation and removal of the projector from the cage. That is, when top track is removed, the wings no longer impede removal of the projector. Once the projector is removed, a person can access the member and connector assembly fasteners inside the cage to adjust the size of the cage (e.g. to accommodate a different sized projector) and/or remove the cage from the drop pipe.

The drop pipe is typically threaded and in such case, the connector assembly has a threaded portion for connecting to the drop pipe. The connector assembly can be a ball and collar assembly which comprises a ball having the threaded portion in a recess of the ball, and a collar having the cage mounting portion at a base of the collar, a cavity for receiving the ball, and a drop pipe opening large enough to pass the drop pipe therethrough to fasten to the threaded portion. The base of the collar can have a rim that defines an opening large enough to pass the ball therethrough; in such case, the cage mounting portion is located at the rim.

Alternatively, the connector assembly can comprise a flange mounting assembly with a hollow cylinder having the threaded portion on an inside surface of the cylinder, and a disc portion extending from a base of the cylinder and having the cage mounting portion; the threaded portion of the hollow cylinder mates with the threaded portion of the drop pipe, thereby securing the apparatus to the drop pipe. This connector assembly can further include a stopper assembly mounted to the cage and comprising a compressible cylinder that is slidable through the mounting assembly cylinder and Into the drop pipe when uncompressed, and that can be expanded laterally inside the drop pipe when compressed, thereby impeding efforts to unscrew the apparatus from the drop pipe. For drop pipes that are right hand threaded, the threaded portion is right hand threaded. The connector assembly can further comprise a left hand threaded bolt extending through the compressible cylinder and a left hand threaded nut threadable onto the bolt to control the compression of the cylinder. This arrangement impedes efforts to unscrew the connector assembly from the drop pipe, as the rotation of the connector assembly (in the right handed thread direction) will cause the left handed nut and bolt to further compress the compressible cylinder, thereby further securing the apparatus to the drop pipe.

DETAILED DESCRIPTION OF EMBODIMENTS OF THE INVENTION

Directional terms such as "top", "bottom", and "upwards" are used in the following description for the purpose of providing relative reference only, and are not intended to suggest any limitations on how any apparatus is to be positioned during use, or to be mounted in an assembly.

According to one embodiment of the invention and referring to FIGS. 1 to 4, a security enclosure 10 for a video projector (not shown) is securely mountable to a drop pipe (not shown) that extends downwards from a ceiling. The security enclosure 10 can be adjusted to house projectors of various sizes, and is engineered to resist removal of a projector housed therein, as well as to resist removal of the security enclosure 10 from the drop pipe. Such projectors include data projectors and home entertainment audio-video projectors.

Components

The security enclosure 10 generally comprises a cage assembly for housing the projector and a connector assembly for connecting the cage assembly to the drop pipe. The cage assembly has a plurality of interconnected members connected together by a plurality of fasteners. The fasteners are inserted into fastener openings provided in spaced intervals along each of the members, thereby enabling the size and shape of the cage assembly to be adjusted to accommodate projectors of different sizes and shapes. One particularly suitable type of fastener is a self-clinching flush head PEM stud manufactured by PennEngineering Fastening Technologies. These threaded fasteners have a self-clinching flush-head design that makes removal of the stud from the member particularly difficult. Suitable fastener openings are provided in each of the members for receiving the PEM stud; a nut can be mated to a PEM stud to fasten two members together. While PEM studs are particularly suitable for use in this embodiment of the invention, other fasteners may be substituted within the scope of the invention, e.g. conventional nut and bolt fasteners.

The members include an outer top plate 12 and an inner top plate 14 slidable relative to the outer top plate 12 in a longitudinal direction. For convenient reference, the edges of the outer and inner top plate 12, 14 that face each other are herein referred to as the "inner edges" and the edges opposite of said inner edges are herein referred to as the "outer edges". Also, the dimension extending between the inner and outer edges is herein referred to as the longitudinal or lengthwise dimension.

Figure 1:
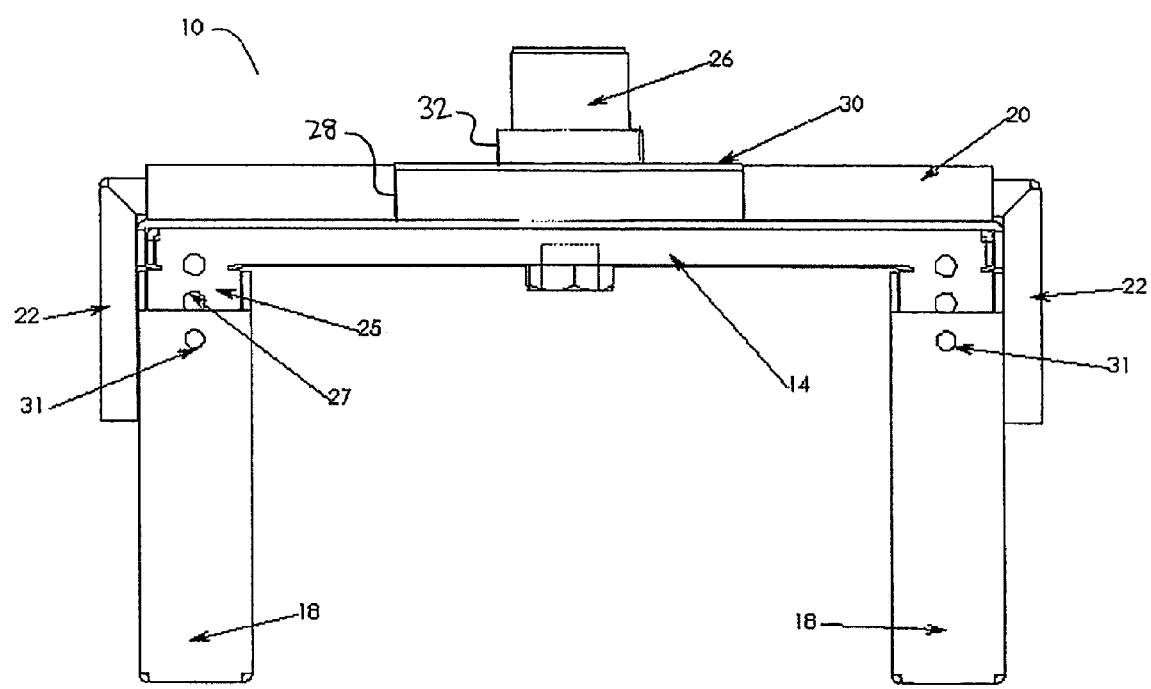
FIG. 1 is a schematic front elevation view of an audio-video equipment security enclosure having a rubber stopper connector assembly.
Figure 2:
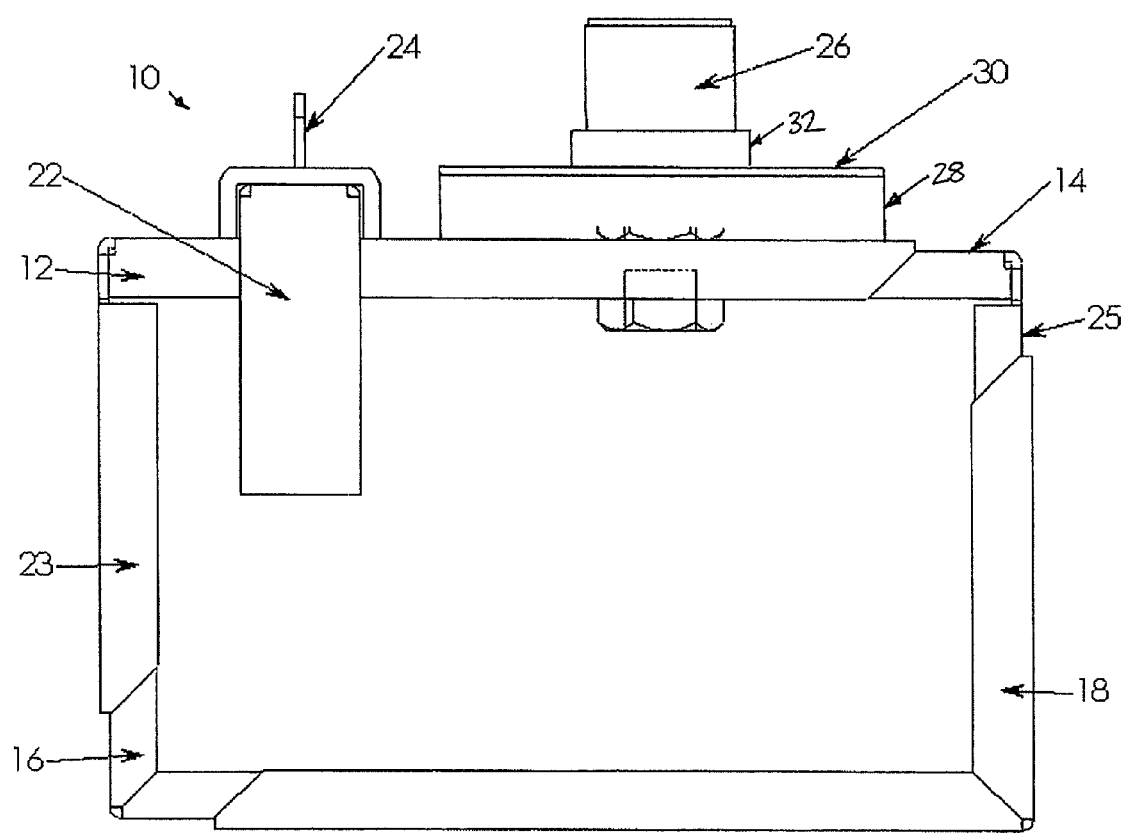
FIG. 2 is a schematic side elevation view of the security enclosure of FIG. 1.
Figure 3:
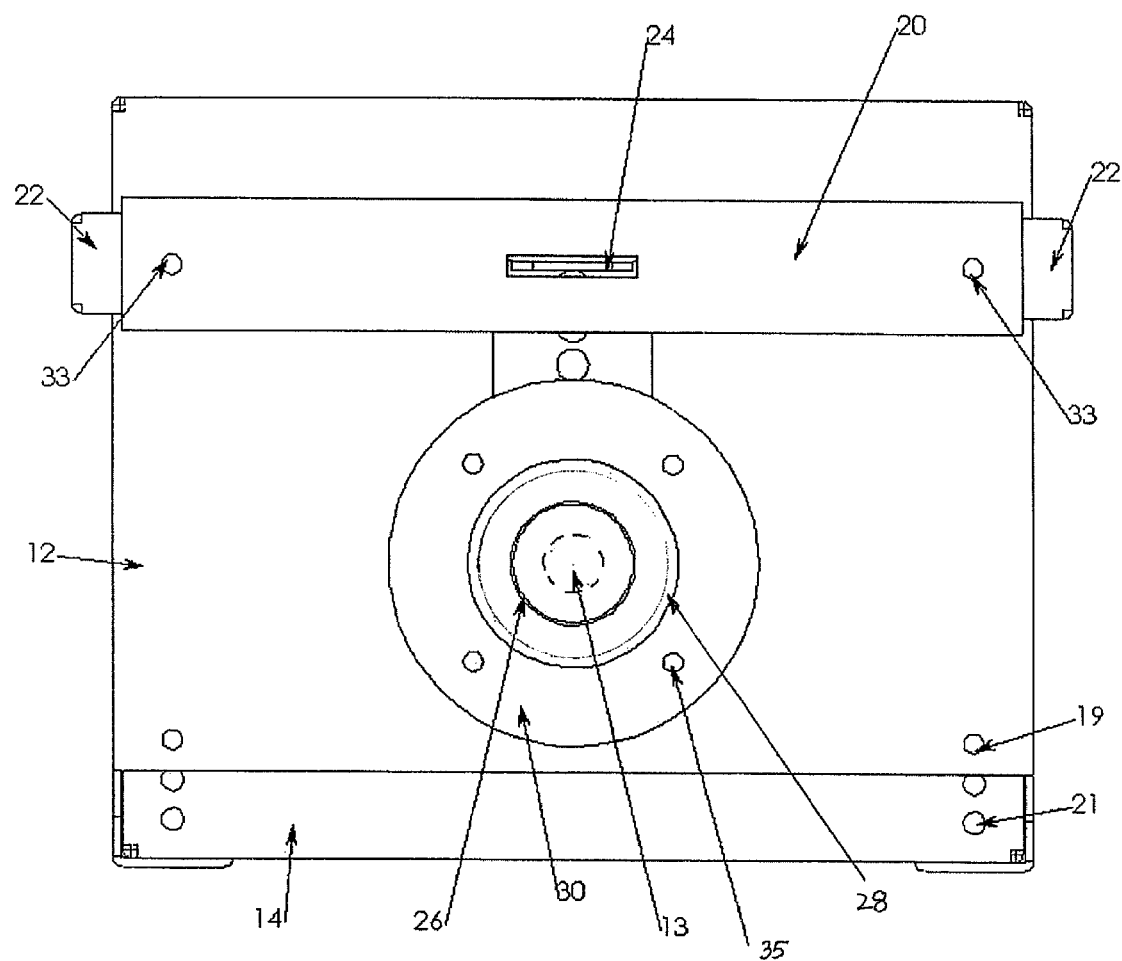
FIG. 3 is a schematic plan view of the security enclosure of FIG. 1.
Figure 4:
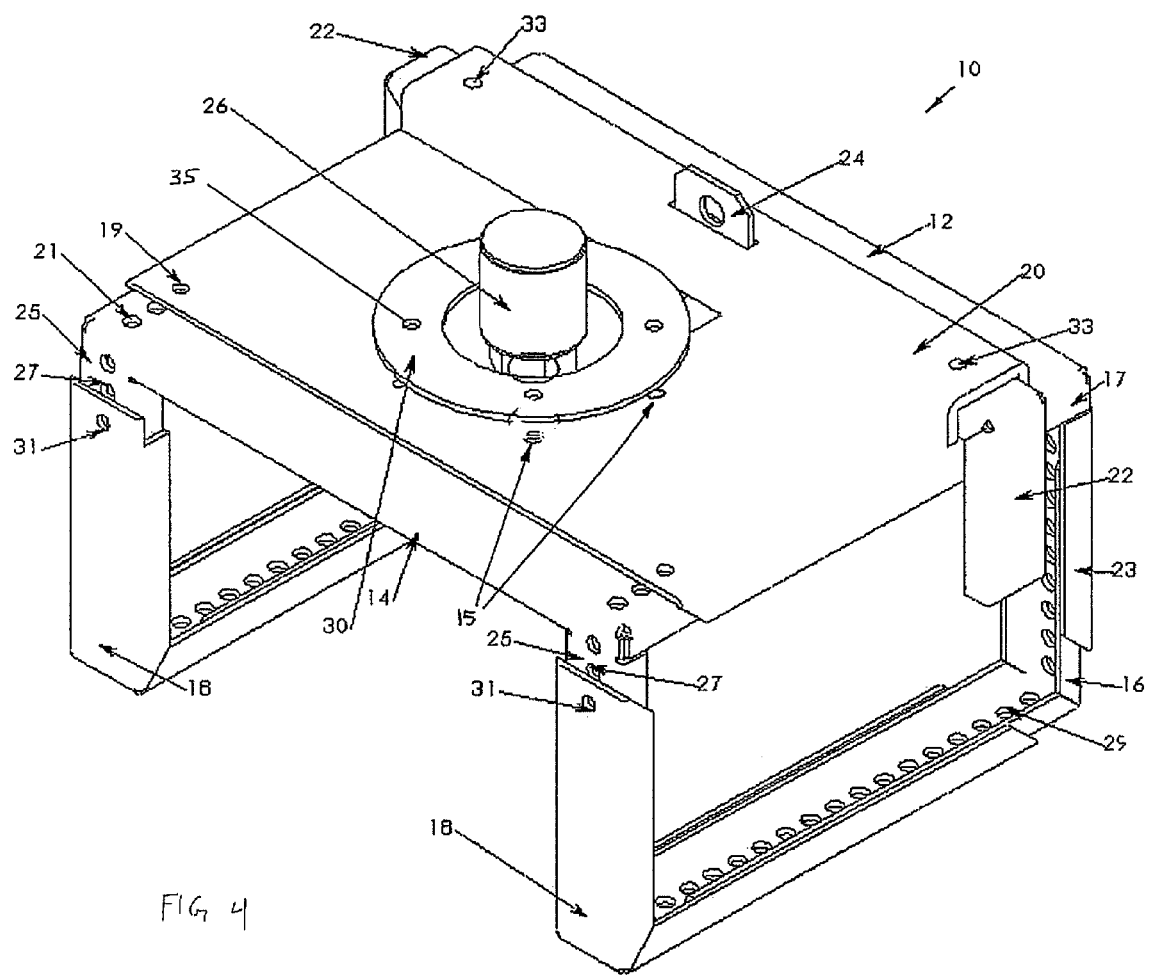
FIG. 4 is a schematic perspective view of the security enclosure of FIG. 1, with a portion of the connector assembly omitted to better show a rubber stopper portion of the connector assembly.
Figure 5:
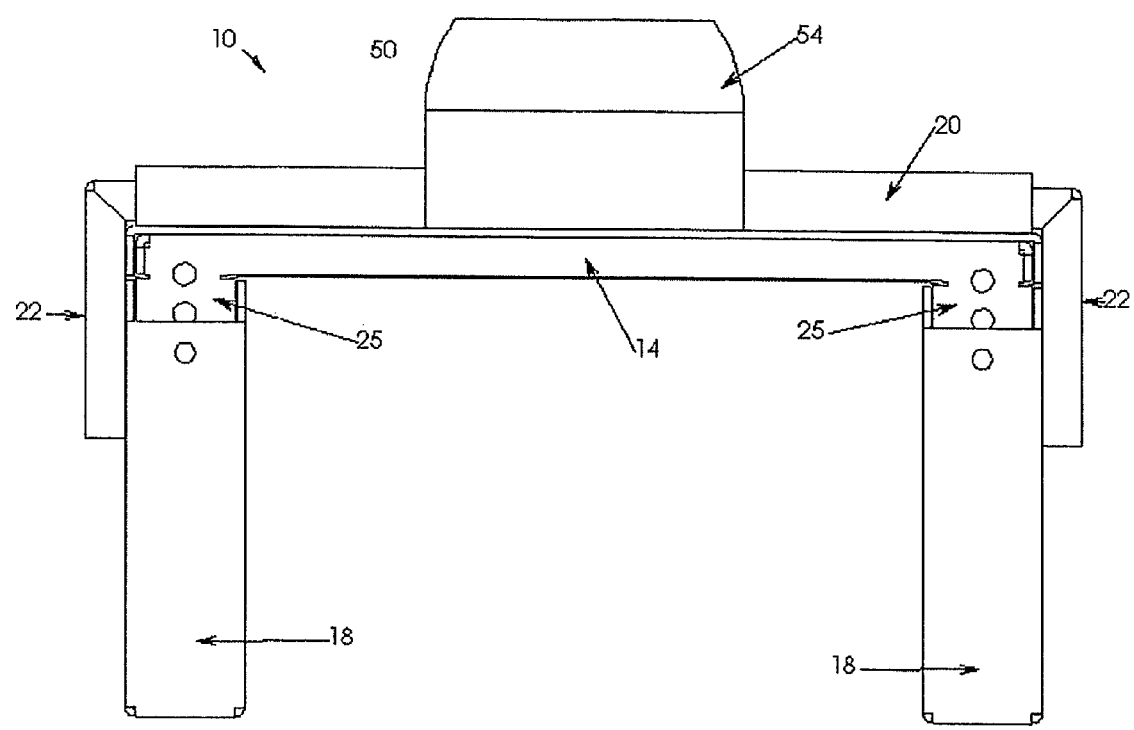
FIG. 5 is a schematic front elevation view of the security enclosure having a ball and collar connector assembly.
Figure 6:
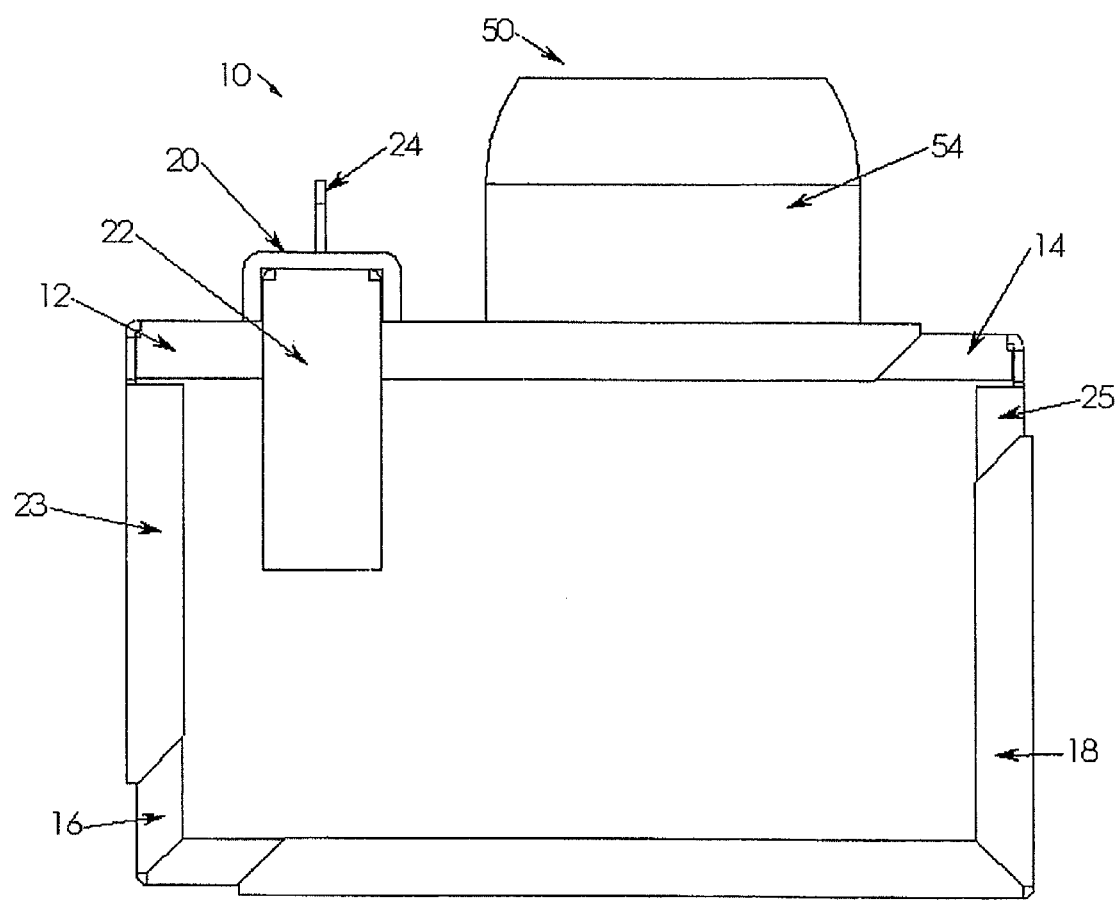
FIG. 6 is a schematic side elevation view of the security enclosure of FIG. 5.
Figure 7:
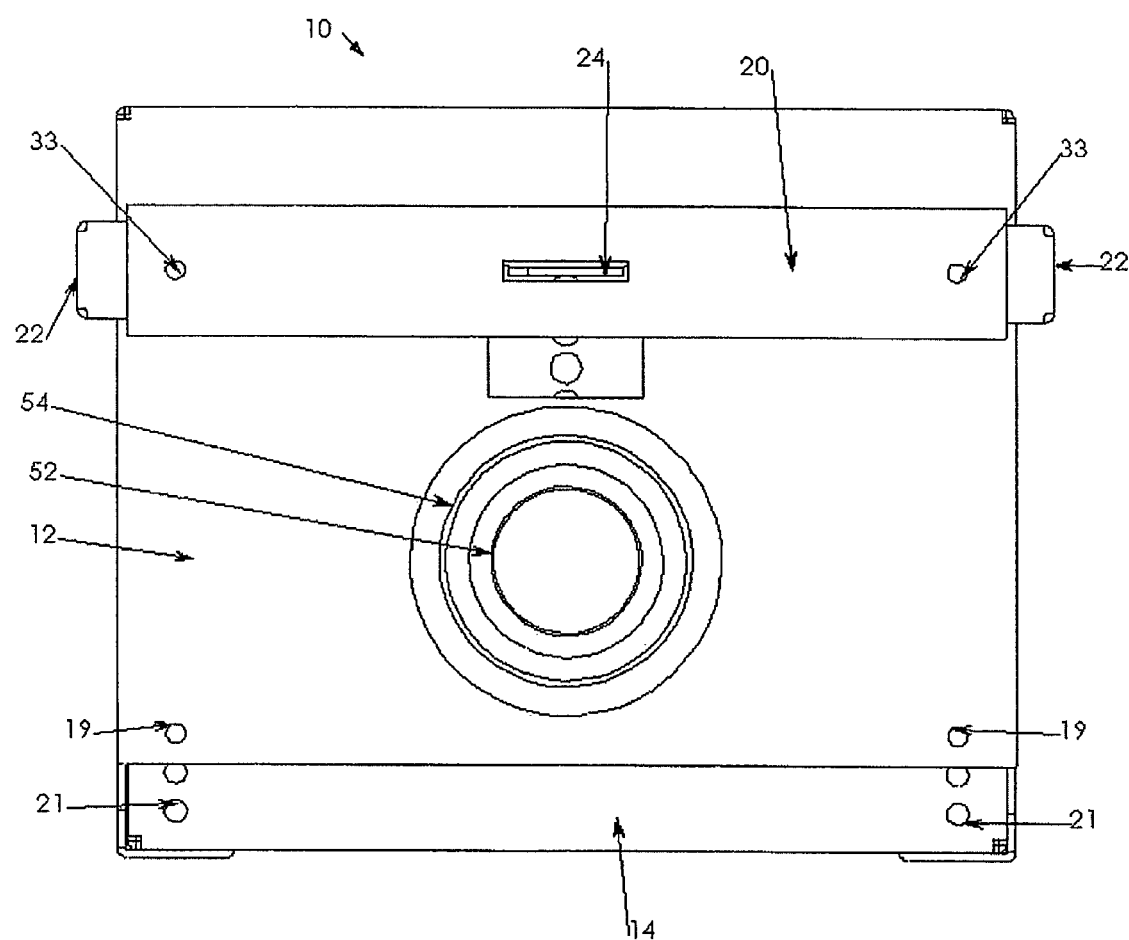
FIG. 7 is a schematic plan view of the security enclosure of FIG. 5.
Figure 8:
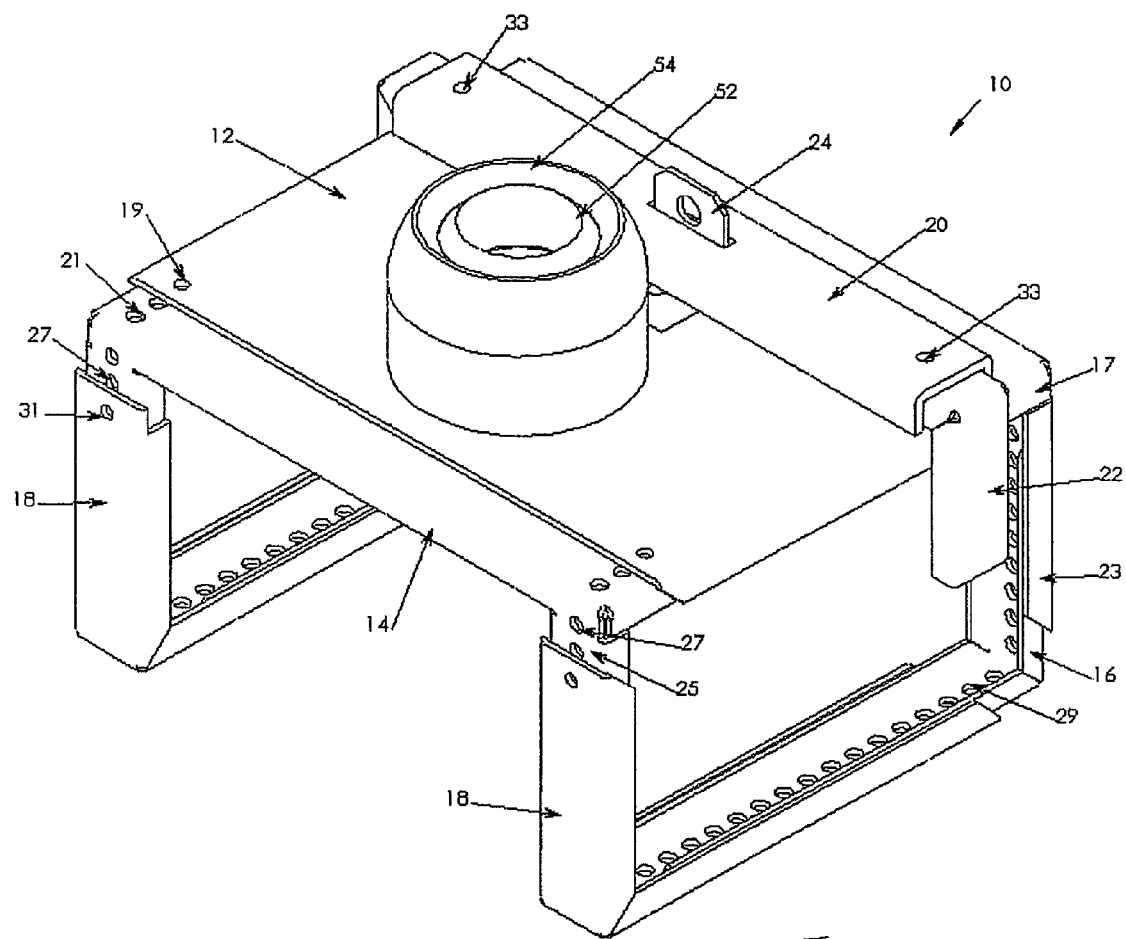
FIG. 8 is a schematic perspective view of the security enclosure of FIG. 5.

A connector assembly opening 13 (shown in dashed line in FIG. 3) has a stopper bolt diameter and extends through the centre of the outer top plate 12. Two pairs of longitudinally-spaced fastener openings 15 (as seen in FIG. 4) each having a PEM stud diameter are located on either side of the connector assembly opening 13 and also extend through the outer top plate 12. Corresponding openings (not shown) are provided for the inner top plate 14, namely, two outer rows of longitudinally-spaced fastener openings corresponding to the position of the fastener openings 15, and a centre row of longitudinally spaced openings located in between the outer rows of fastener openings and corresponding to the location of the connector assembly opening 13. A ⅜" stopper bolt (not shown) is insertable through one of the centre row openings of the inner top plate 14, and through the connector assembly opening 13. Also, ¼" top ring PEM studs are insertable through the four fastener openings 15 of the outer top plate 12 and through corresponding outer row openings of the inner top plate 14. Conventional nuts can be removably fastened to the bolt portion of the PEM stud.

At each side edge of the outer top plate 12 are a pair of parallel, longitudinally-extending channels 17 that slidably receive the inner top plate 14. A fastener opening 19 is located at each corner of the inner end of the outer top plate 12. Two longitudinally extending rows of spaced fastener openings 21 in the inner top plate 14 correspond to the location of the fastener openings 19 of the outer top plate 12. Each fastener opening 19 in the outer top plate 12 can be aligned with one of the fastener openings 21 of the Inner top plate 14 to receive a PEM stud (not shown) therethrough. PEM studs are securely attached to the outer top plate 12 by Insertion through fastener opening 19 during assembly. These PEM studs can then threaded through appropriate fastener openings 21 of the inner top plate 14 and nuts can be fastened to the PEM studs to secure the inner and outer top plates 12, 14 together.

A lock tab 24 with an aperture therethrough extends upwards from the outer top plate 12.

A pair of vertically extending channels 23 extend downwardly from the outer corners of the outer top plate 12. Similarly, a pair of vertically extending members 25 extend downwardly from the outer corners of the inner top plate 14. A single fastener opening (not shown) is provided for each vertically extending channel 23, and a row of spaced fastener openings 27 extend along each vertically extending member 25. A suitable spacing can be ½". A pair of L-shaped inner support brackets 16 each have a vertical portion and a horizontal portion extending perpendicularly from the base of the vertical portion. The vertical portions are vertically slidable inside each respective outer top plate channel 23 and are positioned so that the respective horizontal portions of the inner support brackets 16 extend inwards. A row of spaced fastener openings 29 extend along the vertical and horizontal portions of each inner support bracket 16 ("vertical fastener opening" 29 and "horizontal fastener opening" 29); a suitable spacing can be ½". PEM studs are securely attached to the vertically extending channels 23 by insertion through the channels' fastener openings during assembly. These PEM studs can then threaded through appropriate vertical fastener openings 29 of the inner support brackets 16 and nuts can be fastened to the PEM studs to secure the inner support brackets 16 and the vertically extending channels 23 together.

Similarly, a pair of L-shaped outer support brackets 18 each have a vertical portion and a horizontal portion extending perpendicularly from the base of the vertical portion. The vertical portions are channel shaped and are thus vertically slidable over each respective vertically-extending top plate member 25 and are positioned so that that the horizontal portions extend inwards. The horizontal portion of each outer support bracket 18 are channel shaped and thus horizontally slidable over a corresponding horizontal portion of the inner support bracket 16. A fastener opening 31 is provided in each of the vertical and the horizontal portions of the outer support bracket 18 ("vertical fastener opening 31 and horizontal fastener opening 31); PEM studs extend through the vertical fastener opening 31 and through one of the fastener openings 27 in the vertically extending members 25 thereby securing the outer support bracket 18 to the inner top plate 14. PEM studs are securely attached to the vertically extending top plte member 25 by insertion through the channels' fastener openings 27 during assembly. These PEM studs can then threaded through appropriate vertical fastener openings 31 of the outer support brackets 18 and nuts can be fastened to the PEM studs to secure the outer support brackets 16 and the vertically extending members 25 together.

Another PEM stud extends through the horizontal fastener opening 31 and can be threaded through one of the openings 29 in the horizontal portion of the inner support brackets 16 to secure the brackets 16, 18 together. Nuts are fastened to the PEM studs to secure the members together; the nuts are located on the inside of the inner top plate 14 and Inside the brackets 16, 18.

When the security enclosure 10 is adjusted to fit snugly around a data projector, it becomes difficult to remove the nuts from the PEM studs, as the projector is in close proximity to the studs and nuts, thereby making the studs and nuts difficult to access. To access the nuts, one must first unlock the cage and remove the data projector. Thus, the projector protects the fasteners of the cage.

A top track 20 is a channel that is positioned transversely across the outer top plate 12. A pair of L-shaped top-track wings 22 each have a horizontal portion that is slidably mounted through each end of the top track 20 and have a vertical portion that extends downwards over each side of the outer top plate 12. Each wing 22 also has a row of spaced fastener openings (not shown) along its horizontal portion; a suitable bolt spacing can be ½". A fastener opening 33 is provided at each end of the top track 20 through which a PEM stud is securely mounted; the PEM stud can be threaded through the fastener openings in the wings 22 and fastened with nuts to secure the parts 20, 22 together. A lock tab opening is provided through the center of the top track 20 that is configured to receive the lock tab 24. This enables the top track 20 to be securely positioned over the outer top plate 12 and secured in place with a padlock threaded through the aperture in the lock tab 24.

Preferably, all of the above parts 12, 14, 16, 18, 22 are made of 12 gauge cold rolled steel, except the top track 20 which is made of ³⁄₁₆" cold rolled steel However, other suitable materials may be used as is known in the art.

The connector assembly comprises a rubber stopper assembly 26 and a mounting flange assembly 28 that together operate to securely connect the cage assembly to a suitable drop pipe extending downwardly from a ceiling. The mounting flange assembly 28 includes a top disc 30 which is a circular plate having a central opening (not shown) that is large enough to pass the drop pipe and the rubber stopper assembly 26 therethrough, and four fastener openings 35 for securely receiving ¼-20×¾" PEM studs that are spaced around the central opening in a location and that correspond to the fastener openings 15 of the outer top plate 12. The mounting flange assembly 28 also includes a mounting flange 32 comprising a disc-shaped base and a right hand, inside-threaded cylinder extending upwards from the base. A central opening (not shown) extends through the flange 32 and corresponds to the central opening of the top disc 30; four fastener openings (not shown) extend through the base and correspond to the four fastener openings 35 of the top disc 30. The diameter of the threaded cylinder and the thread pattern is selected to match the diameter and thread pattern of the drop pipe. PEM studs (not shown) extending from the top disc 30 can be threaded through corresponding fastener openings in the mounting flange 32, outer top plate 12, and inner top plate 14. These studs can be fastened with respective nuts to secure the four components 30, 32, 12, 14 together; the nuts are fastened to the studs on the underside of the inner top plate 14.

Figure 9:
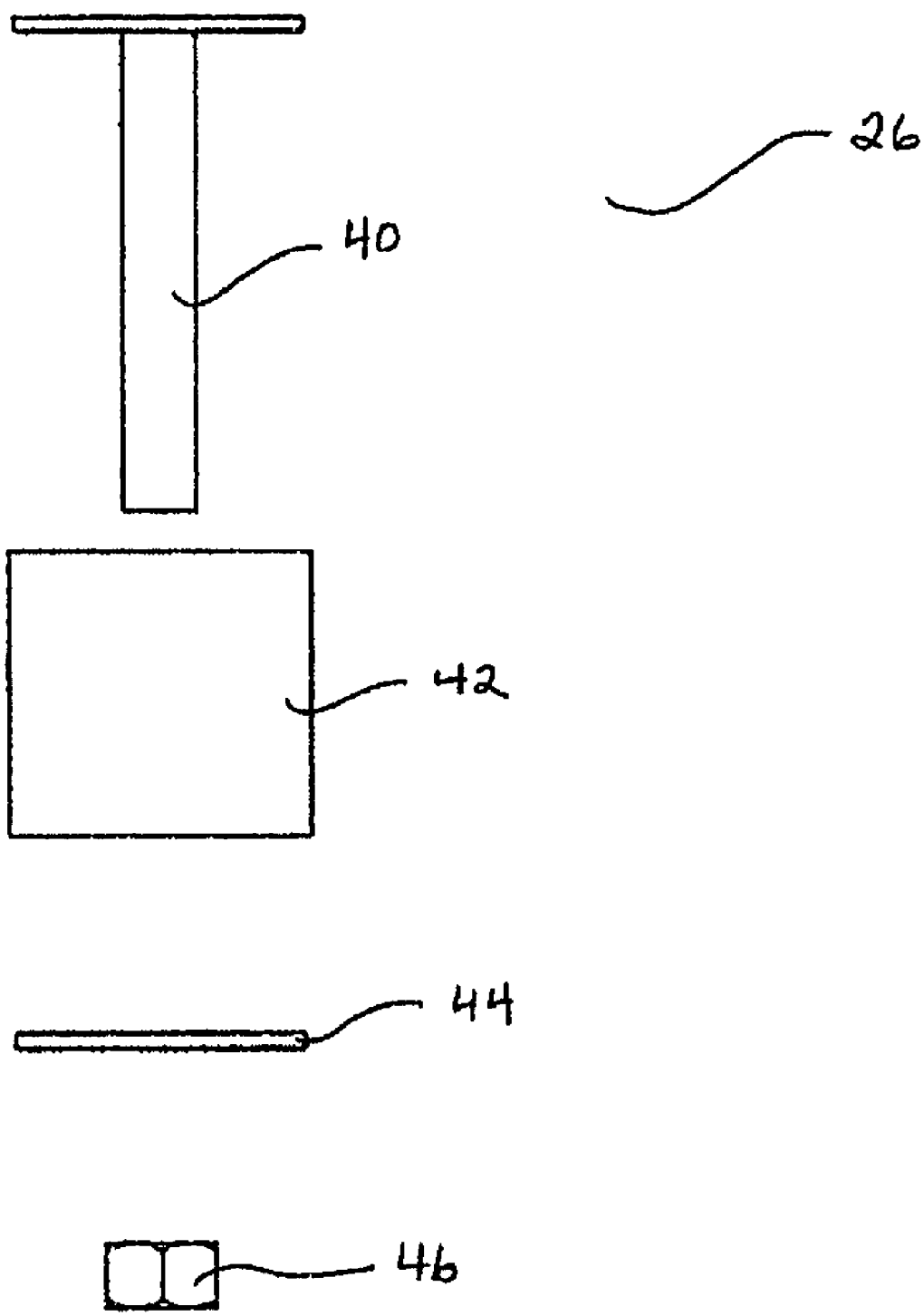
FIG. 9 is a schematic exploded view of the rubber stopper connector.
Figure 10A:
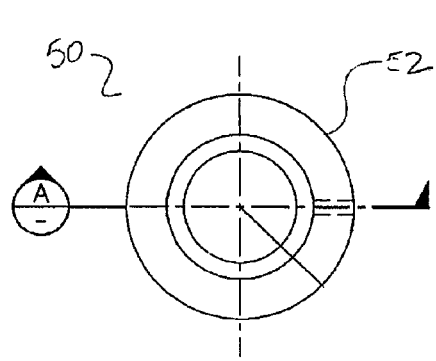
FIG. 10(a) is a plan view of a ball of the ball and collar connector.
Figure 11A:
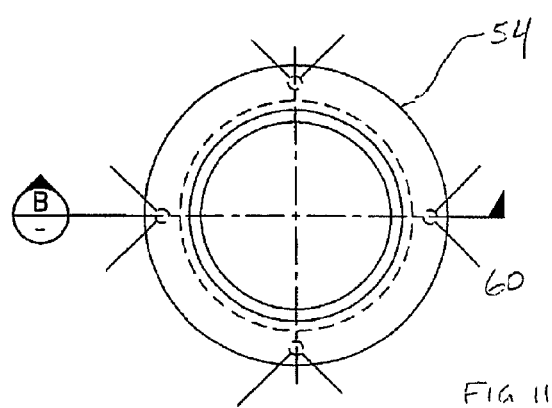
FIG. 11(b) is a sectioned side elevation views of the collar at section line B with the ball shown in outline and inserted inside the collar.
Figure 10B:
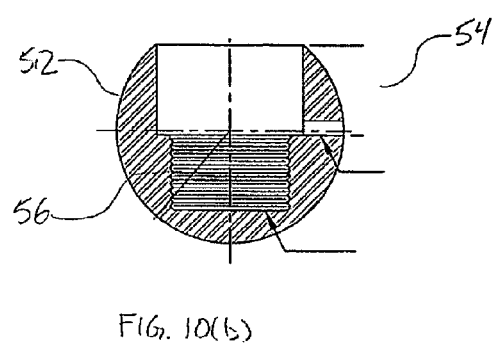
FIG. 10(b) is a sectioned side elevation views of the ball at section line A; and, FIG. 11(a) is a plan view of a collar of the ball and collar connector.
Figure 11B:
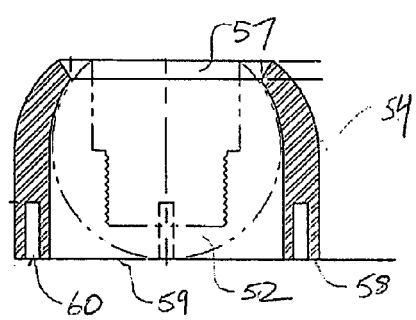

Referring to FIG. 9, the rubber stopper assembly 26 includes a left hand threaded mounting bolt 40 having a disc shaped head 41 at a top end thereof, a hollow compressible rubber cylinder 42, a first washer 44, a first left hand threaded nut 46, a second washer (not shown) and a second left hand threaded nut (not shown). The bolt 40 has a diameter that corresponds to the central opening 13 in the top plate 12; such a suitable bolt 40 is a conventional 5/16×1½" fender-washer welded to a 2.5" section of a conventional ⅜' left hand threaded redi-rod. A suitable cylinder 42 has a uncompressed diameter that will fit inside a hollow drop pipe; for a 1.5" drop pipe, a suitable cylinder is a 1 9/16'OD×1.75"×⅜' ID F 600 MF type rubber cylinder. A suitable washer for the first washer 44 can be a conventional 1½×⅜" fender washer, and for the second washer a conventional ⅜ flat washer. A suitable nut for the first and second nuts can be a conventional left hand threaded ⅜" nut. The assembly 26 is assembled by threading the cylinder 42, first washer 44, and then the first nut 46 over the bolt 40. The first nut 46 is used to compress the first washer 44 against the cylinder 42. Enough of the threaded bolt 40 protrudes past the first washer 44 and nut 46 to enable the bolt to extend through the top plates 12, 14 (the nut 46 is larger than the central opening 13 of the top plate 12) and mate with the second washer and nut on the underside of the top plates 12, 14.

Assembly

The following description explains how to assemble the enclosure 10, house a projector within the enclosure 10, and how to mount the enclosure 10 and projector to a ceiling mounted drop pipe:

Determining Enclosure Width Setting (a) Select one outside bracket 18 and one inside bracket 16.

(b) Thread PEM stud extending through the horizontal fastener opening 31 of the outside bracket 18 through the last horizontal fastener opening 29 of the inside bracket 16, forming a first "U" shaped bracket assembly 16, 18 at its widest setting. (note: if PEM studs are not pre-installed on the outside bracket 18 or on other members, any suitable off-the shelf fasteners can be substituted wherever PEM studs are used)

(c) Pass the first bracket assembly 16, 18 over a projector that is to be housed in the enclosure 10.

(d) If the projector passes through the first bracket assembly 16, 18, reduce the width of the first bracket assembly 16, 18 by one fastener opening and repeat step (c).

(e) Repeat step (d) until the first bracket assembly 16, 18 fits snugly around the projector.

(f) Fasten nut to PEM stud with the nut on the inside of the bracket assembly 16, 18.

(g) Assemble the other two brackets 16, 18 to form a second bracket assembly 16, 18 and the outer and inner top plates 12, 14 to form a top plate assembly 12, 14, both assemblies 12, 14, 16, 18 having the same width setting as the first bracket assembly 16, 18.

Determining Enclosure Height Setting (a) Couple the first bracket assembly 16, 18 to the top plate assembly 12, 14 by threading PEM studs extending from the fastener openings in vertical members 23 to the last vertical fastener openings 29 in the inner brackets 16, and by threading PEM studs extending from the fastener openings 31 in outer bracket 18 to the last fastener openings 27 in the vertical channel 25, thereby defining a rectangular projector opening at its tallest setting.

(b) Pass the projector through the projector opening; if the projector passes through, reduce the height of the projector opening by one fastener opening, and try again.

(c) Repeat step (b) until the data projector fits snugly within the projector opening.

(d) Couple the second bracket assembly 16, 18 to the top plate assembly 12, 14 and secure both bracket assemblies 16, 18 to the top plate assembly 12, 14 with respective nuts and PEM studs, such that the projector rests on the horizontal portions of the brackets 16, 18. The PEM studs extend from the parts 12, 14, 16, 18 such that the nuts are on the inside of the cage assembly.

Determining Enclosure Depth Setting (a) Position the projector inside the cage assembly in a satisfactory position, e.g. with a clear line-of-sight to a wall screen, and with unobstructed access to connection ports on the projector.

(b) Once the projector is positioned, place the wings 22 in line with the lock tab 24 on the outside top plate 12, as close to the edges of the projector as possible.

(c) Place the top track 20 over the wings 22, then thread PEM studs extending from fastener openings 33 in the top track 20 through fastener openings in each respective wing 22, to form a locking bar assembly 20, 22.

(d) Lift the locking bar assembly 20, 22 from the top plates 12, 14, and fasten nuts to the PEM, with the nuts on the inside of the locking bar assembly 20, 22.

(e) Note which side the projector lens is on and remove the projector from the cage assembly. The cage is now set at a size that impedes access to the nuts of the fasteners when the projector is located therein.

The following describes installing the enclosure 10 and projector to a ceiling mounted 1.5" NPT drop pipe:

Installing the Stopper Assembly

Assemble the stopper assembly 26 as shown in FIG. 9.

Tighten the first nut 46 until the cylinder 42 will just fit inside the drop pipe, but will not spin.

Push the stopper assembly 26 into the drop pipe until the first washer 44 is just about inside the drop pipe, about 2 or 3 mm below the bottom of the pipe.

Tighten the first nut 46 until the stopper assembly 26 will not turn on its own Inside the drop pipe. Care should be taken not to over-tighten.

Mounting the Assembled AV Cage

Slip the top ring 30 over the drop pipe with the PEM studs pointing down.

Screw the flange 32 onto the threads of the drop pipe until tight. Then, rest the top ring 30 on top of the flange 32, but do not put the studs through the holes in the flange 32.

Pick up the second washer, second left hand nut, and the cage assembly and thread the rubber stopper assembly bolt 40 through the central openings 13 of the top plates 12, 14. Temporarily secure the cage enclosure to the stopper assembly 26 by threading the second nut to the bolt 40.

Spin the cage so the side where the lens will be is facing the screen. Slip the studs from the top ring 30 through fastener openings in the flange 32, and turn the cage assembly back (as if to loosen) until the studs extending from the top ring 30 and flange 32 line up with the fastener openings 15 in the outer top plate 12. Push the studs through into the outer top plate 12.

Fasten nuts onto the studs from the top ring 30.

Remove the second left hand nut from the center bolt 40,

Turn the cage assembly (tighten onto the drop pipe) so the front of the cage assembly is facing a desired position, e.g. towards a wall screen.

Put on the second washer on the rubber stopper assembly bolt 40, and then secure the second nut to the bolt 40. The enclosure 10 is now securely fastened to the drop pipe; the rubber stopper assembly 26 impedes attempts to unscrew the enclosure 10 from the drop pipe, as the left-hand threads of the bolt 40 are in an opposite direction to the right hand threads of the drop pipe. Furthermore, access to the second nut of the rubber stopper assembly 26 is impeded by the snug fit of the projector inside the cage.

Installing the Data Projector

Slide the projector into the cage assembly.

Position the lock bar assembly 20, 22 in place over the top tab 24 and lock in place with a lock. A suitable lock can be a 70 mm disk lock such as Diskus type manufactured by ABUS Lock.

An advantageous feature of the enclosure 10 is how easy it is to access the fasteners (PEM studs) that secure the adjustability of the enclosure 10 when the data projector is not in the enclosure 10, and then how difficult it is to access those same fasteners once the projector is locked inside the enclosure 10. The single disk lock that secures the lock bar assembly 20, 22 in place impedes access to the nuts of the fasteners. Removal of the lock bar assembly 20, 22 enables the projector to easily removed from the enclosure 10, thereby providing ready access to the nuts so that the size and shape of the enclosure can be adjusted.

According to another embodiment of the invention, and referring to FIGS. 5–8 and 11(*a*) to (*d*) a security enclosure 10 is provided that has a different connector assembly 50 than what is disclosed in the first embodiment. In particular, the connector assembly 50 of this embodiment comprises a ball 52 and a collar 54 which together enable the cage assembly to be tilted into a desirable position.

Both ball 52 and collar 54 are machined from aluminum; however, other suitable materials can be used for these parts 52, 54 as is known in the art. The connector assembly 50 consists of a 1.5" radius ball 52 having a cylindrical recess 56 of which a portion is threaded. The diameter of the cylinder 56 and the thread pattern are selected to match the drop pipe, so that the ball 52 can be screwed onto the drop pipe. The collar 54 has a cavity that snugly receives the ball 52, and a top opening 57 at the top of the collar 54; this opening is large enough to pass the drop pipe therethrough but not the ball 52. The collar 54 also has a bottom rim 58 defining a bottom opening 59 that is large enough to pass the ball 52 therethrough. Four threaded bolt openings 60 extend into the rim and are spaced to match the bolt openings in the outer top plate 12.

The ball and collar assembly 50 is mounted to the cage assembly and drop pipe as follows:

(a) Fit the ball 52 inside the collar 54 such that the threaded cylinder 56 of the ball 52 faces the top opening of the collar 54.

(b) Screw the ball 52 onto the drop pipe and tighten the set screw.

(c) Position the assembled cage assembly against the collar 54 rim such that the fastener openings 15 in the outer top plate 12 and the bolt openings 60 in the collar rim are aligned.

(d) Insert cap screws into each of the four fastener openings 15, 60 from inside the cage assembly, thereby securing the cage assembly to the collar 54.

When this unit is used, it replaces rubber stopper assembly 26 and the mounting flange assembly 28 of the first embodiment.

While the preferred embodiments of the invention has been illustrated and described, it will be appreciated that various changes can be made therein without departing from the scope and spirit of the invention.

What is claimed is:

1. An apparatus for securing a projector, the apparatus being mountable to a ceiling drop pipe and comprising (a) a cage having a plurality of interconnected members that together define an enclosure for housing a projector and impeding removal of the projector from the cage, at least some of the members being connected together by at least one member fastener that is fastenable from inside the cage, such that the position of at least some of the members can be adjusted relative to other members so that the size of the enclosure can be adjusted to fit the projector snugly therein, thereby impeding access to the fastener, and wherein two of the members are top plates connected to each other by at least one of the member fasteners, and laterally adjustable relative to each other such that the width of the cage can be adjusted; and, (b) a connector assembly connectable to a ceiling drop pipe, and having a cage mounting portion mounted to at least one of the members by at least one connector assembly fastener that is fastenable from inside the cage.

2. An apparatus as claimed in claim 1 wherein the cage mounting portion of the connector assembly is mounted to one of the top plates.

3. An apparatus as claimed in claim 2 wherein some of the members are top plate members that extend downwardly from the top plates, and wherein some of the members are vertically extending members that extend generally vertically and are adjustably connected to the top plate members by at least one of the member fasteners such that the height of the cage can be adjusted.

4. An apparatus as claimed in claim 3 wherein some of the members are lateral support members for supporting a projector and which extend laterally from the vertically-extending members and are adjustably connected to each other by at least one of the member fasteners such that the width of the cage can be adjusted.

5. An apparatus as claimed in claim 4 wherein some of the members form a lock bar assembly comprising a top track mounted to at least one of the top plates and a pair of L-shaped wings having a downwardly-extending portion for impeding removal of the projector from the cage, and a laterally-extending portion connected to the top track by at least one of the member fasteners such that the depth of the cage can be adjusted.

6. An apparatus as claimed in claim 5 wherein the top track is removably mounted to the at least one of the top plates by a lock, wherein removal of the top track from the rest of the cage enables installation and removal of the projector from the cage.

7. An apparatus as claimed in claim 1 wherein the connector assembly comprises a ball having a threaded portion in a recess of the ball, and a collar having the cage mounting portion at a base of the collar, a cavity for receiving the ball, and a drop pipe opening large enough to pass a threaded drop pipe therethrough to fasten to the threaded portion.

8. An apparatus as claimed in claim 7 wherein the base of the collar has a rim that defines an opening large enough to pass the ball therethrough, and wherein the cage mounting portion is located at the rim.

9. An apparatus as claimed in claim 1 wherein the connector assembly comprises a flange mounting assembly with a hollow cylinder having a threaded portion on an inside surface of the cylinder, a disc portion extending from a base of the cylinder and having the cage mounting portion and a stopper assembly mounted to the cage and comprising a compressible cylinder that is slidable through the mounting assembly cylinder and into the drop pipe when uncompressed, and that can be expanded laterally inside the drop pipe when compressed, thereby impeding efforts to unscrew the apparatus from the drop pipe.

10. An apparatus as claimed in claim 9 wherein the threaded portion is right hand threaded, and the connector assembly further comprises a left hand threaded bolt extending through the comprehensible cylinder and a left hand threaded nut threadable onto the bolt to control the compression of the cylinder.

* * * * *